(12) United States Patent
Battarel et al.

(10) Patent No.: US 6,593,996 B2
(45) Date of Patent: Jul. 15, 2003

(54) SYSTEM FOR PROJECTING OR DISPLAYING IMAGES

(75) Inventors: Denis Battarel, Thorigné-Fouillard (FR); Valter Drazic, Betton (FR)

(73) Assignee: Thomson Licensing SA, Boulogne Cedex (FR)

( * ) Notice: Subject to any disclaimer, the term of this patent is extended or adjusted under 35 U.S.C. 154(b) by 0 days.

(21) Appl. No.: 09/780,939

(22) Filed: Feb. 9, 2001

(65) Prior Publication Data

US 2001/0015794 A1 Aug. 23, 2001

Related U.S. Application Data

(63) Continuation of application No. 09/209,204, filed on Dec. 10, 1998.

(30) Foreign Application Priority Data

Dec. 29, 1997 (FR) .............................................. 97 16636

(51) Int. Cl.[7] ........................ G03B 12/24; G03B 27/32; G03B 21/26; G03B 21/00; G02F 1/1335
(52) U.S. Cl. ............................. 355/44; 355/32; 355/43; 355/45; 355/46; 353/30; 353/31; 353/34; 353/38; 353/40; 353/122; 349/5; 349/7; 349/67; 349/108
(58) Field of Search ............................. 355/32, 43, 44, 355/45, 46; 353/38, 40, 122, 30, 31, 34; 349/5, 7, 67, 108

(56) References Cited

U.S. PATENT DOCUMENTS

| | | | | | |
|---|---|---|---|---|---|
| 4,770,525 | A | * | 9/1988 | Umeda et al. | 353/122 |
| 5,098,184 | A | * | 3/1992 | van den Brandt et al. | |
| 5,150,138 | A | * | 9/1992 | Nakanishi et al. | 353/38 |
| 5,418,583 | A | * | 5/1995 | Masumoto | 353/38 |
| 5,467,206 | A | * | 11/1995 | Loiseaux et al. | 359/40 |
| 5,701,169 | A | * | 12/1997 | Yoshioka | 355/30 |
| 5,755,503 | A | * | 5/1998 | Chen et al. | 353/38 |
| 5,758,940 | A | * | 6/1998 | Ogino et al. | 353/38 |
| 5,786,939 | A | * | 7/1998 | Watanabe | 359/621 |
| 5,865,521 | A | * | 2/1999 | Hashizume et al. | 353/38 |

* cited by examiner

*Primary Examiner*—David M. Gray
*Assistant Examiner*—Khaled Brown
(74) *Attorney, Agent, or Firm*—Joseph S. Tripoli; Harvey D. Fried; Joseph J. Kolodka

(57) ABSTRACT

The invention relates to a system for projecting or displaying images comprising a valve exhibiting a plurality of image-forming elements having a light transmission coefficient which can be controlled so as to present the image, and a means of illuminating the valve comprising a light source and an integrator having two lens arrays associated in such a way that each lens of the second array distributes over the valve the light received from a corresponding lens of the first array. This system comprises a means for focusing the illuminating beam onto the integrator. The dimensions of the integrator are thus minimized. The focusing means comprises, for example, a reflector which reflects the light produced by the source, the integrator being arranged substantially in the focal plane of the reflector.

16 Claims, 2 Drawing Sheets

SYSTEM FOR PROJECTING OR DISPLAYING IMAGES

RELATED APPLICATION

This application is a continuation application of U.S. patent application Ser. No. 09/209,204 entitled "SYSTEM FOR PROJECTING OR DISPLAYING IMAGES", filed Dec. 10, 1998, on behalf of the inventors named herein.

FIELD OF THE INVENTION

The invention relates to an illuminating device having an optical integrator, especially for a system for projecting or displaying images. It also relates to such a system.

BACKGROUND OF THE INVENTION

In the projection (or display) of images, especially of television type, it is known practice to use a liquid-crystal optical valve, the transparency of each image-forming element of which is controlled as a function of the luminance of each point of the image to be formed.

The luminous energy for the projection is delivered by an illuminating device behind the valve and an optical system in front of the valve projects the image onto a screen. It is also possible to display the valve either directly or by way of an optical magnifying system.

In order for the projected or displayed image to correctly restore the image formed in the valve, it is necessary for the illuminating of the valve to be uniform. This problem is not easily solved, in particular, because the illumination originates from a source of limited extent.

One solution consists in using an optical integrator. An example of a known projector having an integrator is depicted in FIG. 1.

In this example, the source 10 is associated with a reflector 12 and the pencils of light reflected by this reflector are collected by a first array 14 of small lenses $14_1, 14_2 \ldots$.

The shape (contour) and the proportions of each lens $14_i$ correspond, preferably, to the shape and to the proportions of the optical valve 16. For example, if the valve is rectangular with proportions of 4:3 or 16:9, the lenses will exhibit the same proportions. With each of these lenses $14_i$ there is associated another small lens $18_i$ of a second array 18. This lens $18_i$ is arranged in such a way that it forms the image of the lens $14_i$ over the whole extent of the valve 16. Thus, even if the various pencils of light originating from the reflector 12 have different energies, this heterogeneity does not result in a heterogeneity of illumination on the valve 16, since the energy of each pencil is distributed over the whole surface of the valve. Furthermore, if the shape and the proportions of each lens $14_i$ correspond to the shape and to the proportions of the valve 16, losses of light are minimized.

The reflector 12 is, for example, elliptical and the source 10 is arranged at the first focus and the pencils received by the lenses $14_i$ are slightly convergent.

A projection objective 20 is provided downstream of the valve 16.

This projection system is of fairly high cost, especially since its various optical components are of large dimensions.

SUMMARY OF THE INVENTION

The invention makes it possible to reduce the dimensions of the optical components.

It starts from the finding that the aperture of the projection objective depends on the angle a at which the centre 0 of the valve sees the second array 18 of lenses and that it is therefore beneficial to decrease this angle and, as a consequence, to decrease the extent of the integrator.

Starting from this finding, the inventors have observed that the surface of the array 18 is not used in an optimal manner. This observation appears in FIG. 1a where it may be seen that the array 18, of circular general shape, is illuminated at localized sites $22_1, 22_2$, etc., that is to say sites which are separated from one another, the sum of the areas of the illuminated zones being substantially less than the area of the disk formed by the array 18.

The illuminating device according to the invention is characterized in that it comprises a means for focusing the light pencils from the reflector onto the integrator.

Thus, each lens of the first array is illuminated at a considerable angle; as a result of this the associated lens of the second array, which lens is intended to image the first lens on the valve, also receives a light beam of considerable angle, this making it possible to increase, preferably maximize, the area of the illuminated part of the second array of lenses. Furthermore, it is possible to minimize the dimensions of the optical integrator, thereby minimizing its cost. Decreasing dimensions of the arrays of the integrator leads to the desired decrease in the angle at which the valve sees the integrator and hence a decrease in the aperture of the projection objective.

Decreasing the aperture of the projection objective makes it possible to increase the contrast since it is known that the use of light rays which are steeply inclined with respect to the normal to the plane of a liquid-crystal valve leads to a decrease in the contrast.

To focus the beam from the reflector onto the integrator, there is provided either a focusing lens or an appropriately shaped reflector, for example an elliptically shaped reflector in which the source is arranged at the first focus and the integrator at the second focus.

The position of the integrator at a point of convergence of the beam makes it possible to use this integrator in a device for projecting or displaying colour images employing a single valve in which each image point is formed from several (in general three) image elements, each of these elements being assigned to a specified colour (red, green and blue, for example), the optical illuminating system being such that a light beam of a specified colour reaches only the image element assigned to this colour. The coloured beams are created from a source of white light and from means of angular separation according to colour. The position of the integrator is such that it does not modify the relative orientation of the rays and thus makes it possible to retain the angular separation of the colours.

In one embodiment, each beam of a specified colour illuminates a part of the surface of the integrator which is assigned thereto. Stated otherwise, the surface of the integrator is divided into several distinct parts and each part is used for a single colour. As a variant, provision is made for juxtaposed integrators, the number of integrators being equal to the number of colours.

In embodiments in which maximum illumination on the valve is desired, a collecting lens is employed between the integrator and the valve so as to superimpose the various beams reaching the screen.

If no collecting lens is used, it is possible to maximize the uniformity of illumination and hence the contrast of the projected or displayed image.

BRIEF DESCRIPTION OF THE DRAWINGS

Other characteristics and advantages of the invention will emerge with the description of certain of its embodiments, this being done with reference to the hereinappended drawings in which.

DESCRIPTION OF PREFERRED EMBODIMENTS

Figure 1:
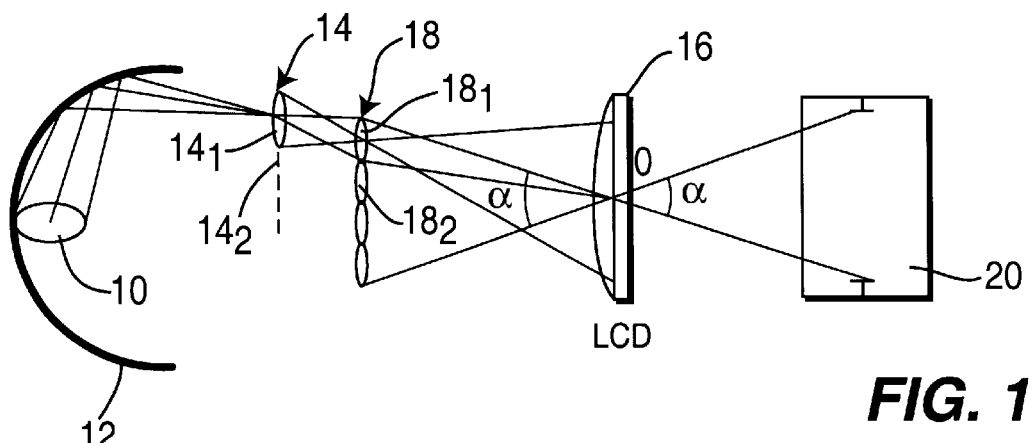
FIGS. 1 and 1a, both already described, depict a known system for projecting images.
Figure 1A:
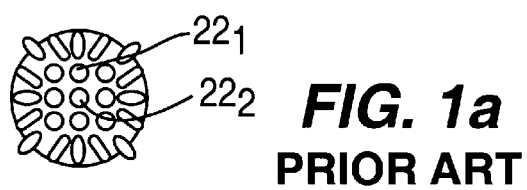
Figure 2:
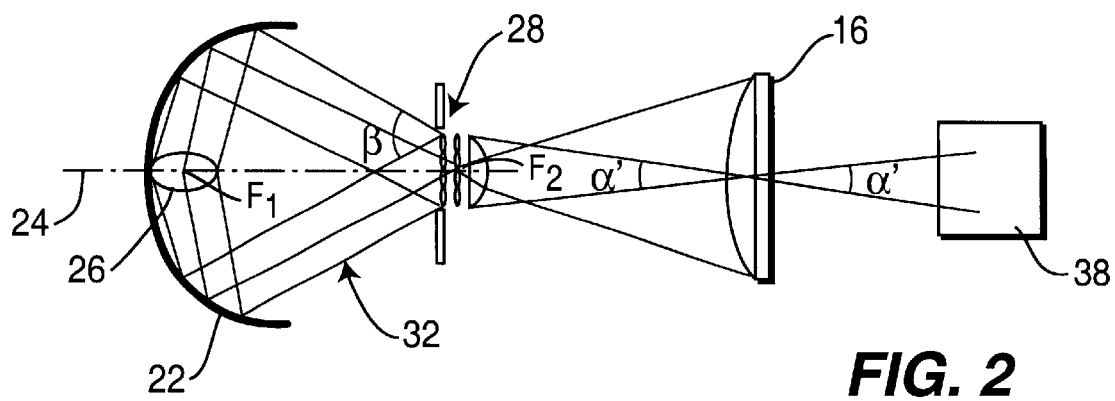
FIG. 2 is a diagram of a projection system in accordance with the invention.

The projection system depicted in FIG. 2 comprises a reflector 22 having the shape of a part of an ellipsoid of revolution with axis 24. A light source 26 is arranged at the first focus $F_1$ of the ellipsoid.

The optical integrator 28 is arranged in the vicinity of the second focus $F_2$ of the ellipsoid. Thus, according to the invention, the integrator 28 is arranged at the point of convergence of the illuminating beam, or in the vicinity of such a point.

The integrator 28 comprises, on the one hand, a first array 30 of lenses $30_1$, $30_2$, etc. which receives directly the beam 32 originating from the reflecting of the radiation from the source 26 off the internal surface of the reflector 22 and, on the other hand, a second array 34 of lenses $34_1$, $34_2$, etc. arranged a short distance from the first array 30 on the opposite side from the source 26.

The arrays 30 and 34 are arranged in a plane perpendicular to the axis 24.

Following the integrator 28 is arranged a collecting lens 36, the role of which will be explained later.

The source 26, the reflector 22, the integrator 28 and the collecting lens 36 make it possible to illuminate the valve 16 in a uniform manner. Following this valve 16 is arranged an objective 38 for projecting onto a screen (not depicted).

The arrays 30 and 34 are associated in such a way that to each lens $30_i$ of the array 30 there corresponds a lens $34_i$ of the array 34.

The lenses of the arrays 30 and 34 are, for example, made of glass.

In a manner known per se, the arrangement of the arrays 30 and 34 and of the valve 16 is such that each lens $30_i$ is in a position which is conjugate with the position of the valve 16 with respect to the associated lens $34_i$. In other words, each lens $34_i$ forms, on the valve 16, the image of the associated lens $30_i$. Of course, in the example, the collecting lens 36 participates in the formation of the image.

Furthermore, likewise conventionally, each lens $30_i$ has substantially the rectangular shape and the proportions of the valve 16 and the magnification of each lens $34_i$ is such that the image of the lens $30_i$ occupies the entire surface of the valve 16.

The first array 30 has a rectangular general shape and the second array 34 exhibits any shape such as that of a disc, a square or a hexagon.

Figure 3:
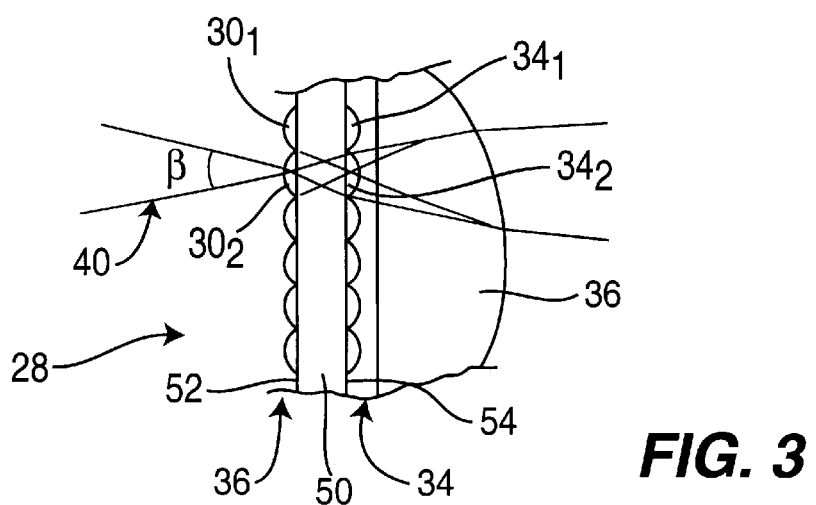
FIG. 3 is a partial view, on a larger scale, of the optical integrator of the system of FIG. 2.

In the example depicted in FIG. 3, the array 30 is formed on the first face 52 of a glass plate 50 and the array 34 is formed on the second face 54 of the same glass plate 50. As a variant (not shown), each array is formed on a distinct glass plate and the two plates are affixed back to back.

The focal plane of the lenses $30_i$ lies substantially in the plane of the lenses $34_i$ so that all of the light originating from the source passes through the lenses of the second array.

According to another arrangement of the invention, the lenses $30_i$ and $34_i$ as well as the reflector 22 are configured in such a way that a converging beam 40 (FIG. 3) on a lens $30_i$, that is to say a beam whose vertex passes through the optical centre of the lens $30_i$, occupies almost the whole of the pupil of the associated lens $34_i$. Thus, the lenses $34_i$ being adjoining, the light flux occupies at most the surface of the array 34.

The numerical aperture of the lenses 30 and 34 is, stated otherwise, of the same order of magnitude as the numerical aperture of the illumination in the plane of the focus $F_2$. For an angle of incidence β of the order of 25°, the numerical aperture is 1:1.5 approximately.

The integrator 28 being arranged at a site where the energy is concentrated, the components of this integrator can be of reduced size and hence relatively inexpensive.

Moreover, the angle β at which the valve 16 sees the integrator being small, it follows that the numerical aperture of the objective 38 downstream of the valve 16 is likewise of a small value, thus making it possible to minimize the cost of this projection objective.

It should be noted that the minimizing of the angular aperture of the beam illuminating the valve 16 also leads to an improvement in the contrast of the projected image, since the rays which are steeply inclined with respect to the normal to the plane of the valve 16 are eliminated, these inclined rays impairing the contrast.

As a variant (not depicted), the reflector has the shape of a paraboloid of revolution and the light source lies at the focus of this paraboloid. In this case, the beam produced by the reflector is focused with the aid of one (or more) lens(es), the integrator then lying in the focal plane, or in the vicinity of the focal plane, of this lens.

In the example described in conjunction with FIGS. 2 and 3, the collecting lens 36 makes it possible to convey the whole of the light flux onto the valve 16. In a variant (likewise not depicted), this collecting lens 36 is not provided. In this case, a loss of light flux may occur, this loss depending on the characteristics of the lamps used. However, it is then possible to maximize the degree of uniformity of the illumination and hence the contrast.

The embodiment described in conjunction with FIGS. 2 and 3 corresponds to the displaying or projecting of a monochrome image with a liquid-crystal valve 16. Two example applications of the invention to the projecting or to the displaying of colour images will now be described in conjunction with FIGS. 4, 4a and 5.

Figure 4:
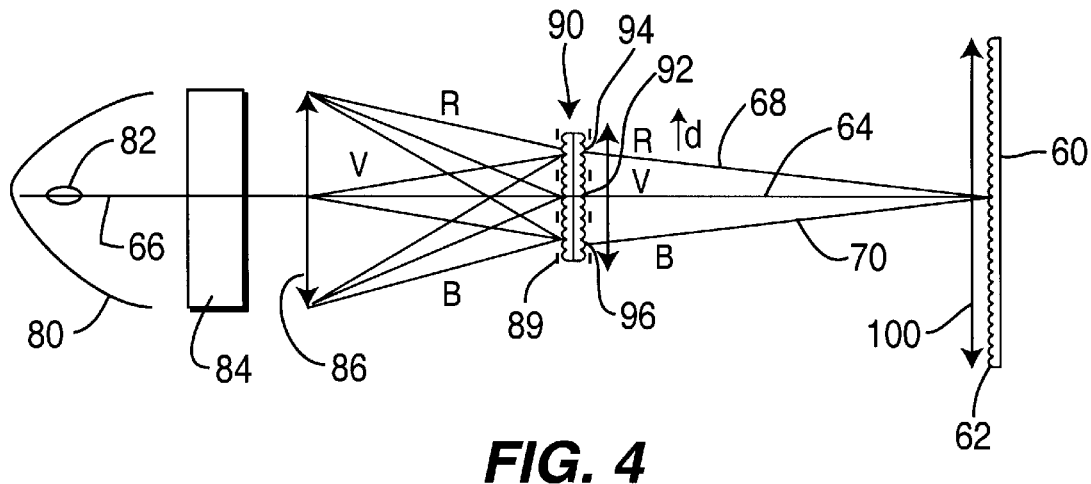
FIG. 4 is a diagram of a system according to the invention allowing the projection of colour images with the aid of a single valve.
Figure 4A:
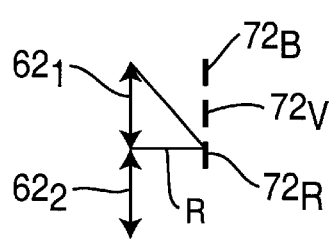
FIGS. 4a and 4b show details of the system of FIG. 4 and, FIG. 5 is a diagram of a system according to the invention allowing the projection of colour images with the aid of three valves.

Reference is made firstly to FIGS. 4 and 4a.

In this example, the valve 60 is such that the image-forming elements are grouped in triplets $72_R$, $72_V$ and $72_B$ (FIG. 4a) and each of the elements of a triplet is associated with a colour, generally red R, green G and blue B. Furthermore, the illuminating device produces light beams in each of the colours which have different orientations. Thus, it may be seen in FIG. 4 that the central pencil 64 of the green-coloured beam is along the axis 66 of the projection system, whilst the central pencil 68 of the red-coloured beam R is inclined with respect to the axis 66, and the central pencil 70 for the blue colour is inclined with respect to the axis by the same angle as the pencil 68, but symmetrically with respect to the axis 66.

The inclinations of these pencils 64, 68 and 70 are such that each beam converges, by virtue of an array 62 of lenses $62_1$, $62_2$, etc. (FIG. 4a), only towards the image-forming elements assigned to the corresponding colour. Thus, the green-coloured beam reaches only the image elements $72_G$. Likewise, the respectively red- and blue-coloured beams reach only the image elements $72_R$ and $72_B$ provided for these respective colours.

In the example, the reflector 80 has the shape of a paraboloid of revolution about the axis 66 and the source 82, at the focus of this paraboloid, produces white light.

The parallel beam reflected by the reflector 80 reaches a device 84 for separating the colours. This device 84 is for example of the type described in French Patent No. 9308470 in the name of Thomson CSF, that is to say it comprises a means for dispersing the colours by means of a holographic grating and a mask with apertures. The apertures are arranged in triplets; each aperture corresponds to a specified colour and is associated with a corresponding image-forming element of the valve 60.

When the colours are correctly separated, the apertures of the mask comprise no filters. If the distribution of the colours is not satisfactory, filters are provided on the apertures.

The beam originating from the device 84 is focused by a lens 86. As may be seen in FIG. 4, the light beams issuing from this lens 86 have different orientations and reach different zones of the integrator 90. Thus, the integrator 90 is separated into three parts, a central part 92 for the green beam, a lateral part 94 for the red beam and another lateral part 96 for the blue beam.

Figure 4B:
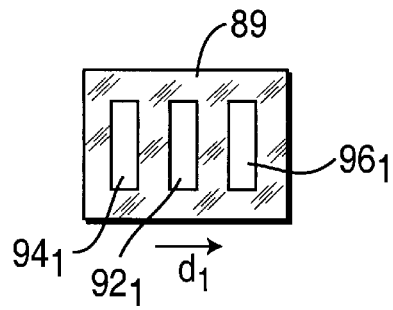

The separation of the integrator 90 into three parts is effected with the aid of a mask 89 arranged, in the example, on that side of the integrator facing the valve 60. This mask is depicted in plan in FIG. 4b. In this figure, the direction $d_1$ corresponds to the direction d in FIG. 4. It comprises apertures 92, 94 and 96 of rectangular shapes.

These apertures, and hence the zones 92, 94 and 96, exhibit contours which are homothetic with the contours of the corresponding zones of the pixels, each zone being imaged, by a lens $62_i$, in the plane of the pixels of the corresponding colour. Stated otherwise, the zones 92, 94 and 96 are homothetic with the triplets of pixels (image elements, $72_B$, $72_G$ and $72_R$.

As in the example of FIG. 2, a collecting lens 98 is provided.

Moreover, a field lens 100 is arranged in front of the array 62.

With this integrator, uniformity of illumination is obtained for each colour, the colour-based integrators being separate. Under these conditions, on the valve 60, the quality of the colours is optimal.

Moreover, this projection system also allows correct saturation of the colours.

As in the embodiment of FIG. 2, good uniformity of illumination and optimal use of the light flux are obtained.

Figure 5:
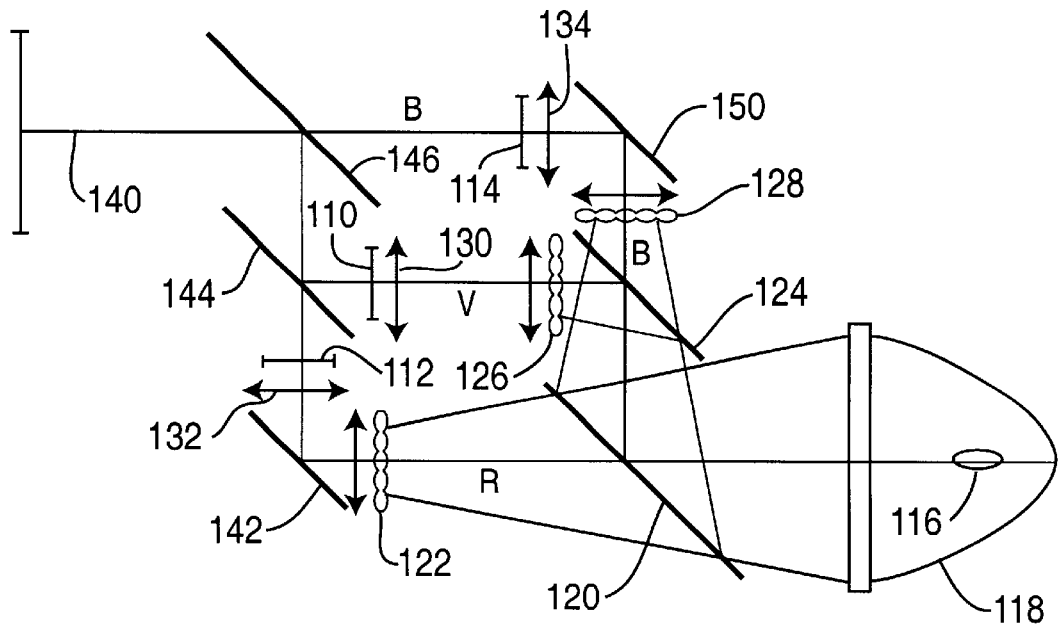

The embodiment depicted in FIG. 5 is a colour image projection system in which the images originating from three valves, 110 for the green colour, 112 for the red colour and 114 for the blue colour respectively, are superimposed. In this example, an integrator is provided for each colour, that is to say for each valve.

The colours are separated by virtue of dichroic mirrors which are placed upstream of the integrators. This results in a saving of space, that is to say, as compared with conventional systems, a reduction in bulk.

The source 116 emits white light which is reflected, by the reflector 118, towards a first dichroic mirror 120. Thus, this mirror 120 transmits a red beam onto the integrator 122 and reflects the remaining components, green and blue, towards a second dichroic mirror 124. The beam originating from the mirror 120 is thus partially reflected towards the integrator 126 assigned to the green colour and is partially transmitted towards the integrator 128 assigned to the blue colour.

With each integrator there is associated a collecting lens, as in the embodiment depicted in FIGS. 2 and 3, as well as a projection lens, 130, 132 and 134 respectively.

Deviating mirrors make it possible to combine all of the beams onto the same axis 140, which is, in the example, the axis of the blue beam. Thus, the red beam is deviated through 90° by a mirror 142 arranged between the collecting lens assigned to the integrator 122 and the projection objective 132. The beam reflected by the mirror 142 passes through a semi-reflecting mirror 144 so as to be reflected by another semi-reflecting mirror 146 which conveys the red beam into the direction of the axis 140. The green beam originating from the valve 110 is reflected by the mirror 144 as well as by the mirror 146.

A mirror 150 conveys the blue beam into the direction of the axis 140, parallel to the axis of the reflector 118.

What is claimed:

1. A system for projecting or displaying colour images comprising:
   a valve exhibiting a plurality of image-forming elements having a light transmission coefficient which can be controlled so as to present the image;
   means for illuminating the valve including a light source and an integrator having first and second lens arrays associated in such a way that each lens of the second array distributes over the valve the light received from a corresponding lens of the first array; and
   means for focusing the illuminating beam onto the integrator, said integrator being arranged substantially in the focal plane of the means for focusing;
   further comprising a source of white light and dichroic mirrors for separating the colours, these dichroic mirrors being arranged between the source and the integrators.

2. The system according to claim 1, wherein the focusing means includes a reflector, the illuminating beam being produced by the reflector which reflects the light produced by the source.

3. The system according to claim 1, wherein the focusing means includes a reflector and a lens, the luminous energy delivered by the source being reflected on the reflector and the light beam reflected being focused by the lens, the integrator lying substantially in the focal plane of the lens.

4. The system according to claim 1, wherein the means for illuminating the integrator and the two arrays of the latter are such that the numerical aperture of the illuminating beam is substantially equal to the numerical aperture of each lens of the second lens array.

5. The system according to claim 1, wherein each lens of the second array is arranged substantially in the focal plane of an associated lens of the first array.

6. The system according to claim 1, wherein the lenses of the second array are all adjoining.

7. The system according to claim 1, wherein the shape of each lens of the first array corresponds to the shape of the valve.

8. The system according to claim 1, wherein the first and second arrays of lenses are arranged on either side of a glass plate.

9. The system according to claim 1, wherein the first and second arrays of lenses are arranged on glass plates affixed back to back.

10. The system according to claim 1, further comprising a collecting lens arranged between the integrator and the valve in such a way that the entire beam reaches the valve.

11. The system according to claim 1, wherein the contours of the distinct parts of the integrator are homothetic with the image elements of each multiplet.

12. The system according to claim 1, wherein the central pencil of a beam of a colour is substantially along the axis of the system and in that the central pencils of two other beams are inclined with respect to the axis by the same angle and symmetrically with respect to this axis.

13. The system according to claim 1, further comprising n valves, preferably three, one per colour, first means for deviating the light beams onto corresponding integrators arranged at sites for focusing the light and second means having mirrors for conveying the beams originating from each of the valves onto the same axis.

14. A system for projecting or displaying images comprising:

a valve exhibiting a plurality of image-forming elements having a light transmission coefficient which can be controlled so as to present the image;

means for illuminating the valve including a light source and an integrator having first and second lens arrays associated in such a way that each lens of the second array distributes over the valve the light received from a corresponding lens of the first array; and means for focusing the illuminating beam onto the integrator, said integrator being arranged substantially in the focal plane of the means for focusing;

wherein the valve comprises image-forming elements associated in multiplets, each element of a multiplet being assigned to a specified colour, optical means being provided for angularly separating the colours of the means for illuminating so that an element assigned to a specified colour receives only a beam of this colour, and in that the integrator is separated into a number of distinct parts equal to the number of colours, each part being assigned to a specified colour.

15. The system according to claim 14, wherein the contours of the distinct part of the integrator are homothetic with the image elements of each said multiplet.

16. The system according to claim 14, wherein the central pencil of a beam of a colour is substantially along the axis of the system and in that the central pencils of two other beams are inclined with respect to the axis by the same angle and symmetrically with respect to this axis.

* * * * *